US009488860B2

United States Patent
Xu et al.

(10) Patent No.: US 9,488,860 B2
(45) Date of Patent: Nov. 8, 2016

(54) LIQUID CRYSTAL PANEL AND LIQUID CRYSTAL DISPLAY

(71) Applicant: BOE TECHNOLOGY GROUP CO., LTD., Beijing (CN)

(72) Inventors: Chao Xu, Beijing (CN); Wei Qin, Beijing (CN); Heecheol Kim, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 256 days.

(21) Appl. No.: 14/348,419

(22) PCT Filed: Aug. 13, 2013

(86) PCT No.: PCT/CN2013/081363
§ 371 (c)(1),
(2) Date: Mar. 28, 2014

(87) PCT Pub. No.: WO2014/173042
PCT Pub. Date: Oct. 30, 2014

(65) Prior Publication Data
US 2016/0048058 A1     Feb. 18, 2016

(30) Foreign Application Priority Data

Apr. 26, 2013   (CN) .......................... 2013 1 0150632

(51) Int. Cl.
*G02F 1/1347* (2006.01)
*G02F 1/1335* (2006.01)
*G02F 1/1333* (2006.01)

(52) U.S. Cl.
CPC ....... *G02F 1/133553* (2013.01); *G02F 1/1333* (2013.01); *G02F 1/1336* (2013.01);
(Continued)

(58) Field of Classification Search
CPC ................... G02F 1/133553; G02F 1/133514; G02F 1/1336; G02F 2001/133342; G02F 1/13471; G02F 1/1347; G02F 1/13718; G02F 1/141; G02F 1/1345; G09G 2300/023
USPC .............................................. 349/74, 81, 83
See application file for complete search history.

(56) References Cited

U.S. PATENT DOCUMENTS 4,892,391 A * 1/1990 Stewart .................... G09G 5/02
345/467
2003/0063243 A1* 4/2003 Roosendaal ...... G02F 1/133553
349/113

(Continued)

FOREIGN PATENT DOCUMENTS

CN          1559022 A       12/2004
CN          1624532 A        6/2005

(Continued)

OTHER PUBLICATIONS

Second Chinese Office Action dated Jul. 16, 2015; Appln. No. 201310150632.1.

(Continued)

*Primary Examiner* — Mike Qi
(74) *Attorney, Agent, or Firm* — Ladas & Parry LLP

(57) ABSTRACT

A liquid crystal panel and a LCD are provided. The liquid crystal panel comprises an array substrate (1) and a color filter substrate disposed (2) as opposed to each other and a liquid crystal layer (3) disposed therebetween, wherein a first barrier layer (5) is disposed on the array substrate (1), the first barrier layer (5) comprises a first part (11) configured to reflect light and a second part (12) configured to transmit light, the first and second parts (11, 12) are arranged alternately; a second barrier layer (6) is disposed on the color filter substrate (2), the second barrier layer (6) comprises a third part (13) configured to reflect light and a fourth part (14) configured to transmit light, the third and fourth parts (13, 14) are arranged alternately; the first part (11) of the first barrier layer (5) and the fourth part (14) of the second barrier layer (6) are equal in width and aligned to each other, the second part (12) of the first barrier layer (5) and the third part (13) of the second barrier layer (6) are equal in width and aligned to each other, such that light passing through the second part (12) of the first barrier layer (5) is reflected by the third part (13) of the second barrier layer (6), and light passing through the fourth part (14) of the second barrier layer (6) is reflected by the first part (11) of the first barrier layer (5). The liquid crystal panel of the invention realizes dual-side display at a lower cost.

12 Claims, 5 Drawing Sheets

(52) U.S. Cl.
CPC ............... *G02F1/133514* (2013.01); *G02F 2001/133342* (2013.01); *G02F 2001/133562* (2013.01); *G02F 2001/133567* (2013.01); *G02F 2001/133616* (2013.01)

(56) References Cited

U.S. PATENT DOCUMENTS

| | | | |
|---|---|---|---|
| 2012/0019750 A1* | 1/2012 | Mitsumoto | G02F 1/1345 349/113 |
| 2016/0027391 A1* | 1/2016 | Gibson | G02B 6/0063 345/690 |

FOREIGN PATENT DOCUMENTS

| | | | |
|---|---|---|---|
| CN | 1690785 | A | 11/2005 |
| JP | 2003-344827 | A | 12/2003 |
| JP | 2005-084431 | A | 3/2005 |
| JP | 3693163 | B2 | 9/2005 |

OTHER PUBLICATIONS

International Preliminary Report on Patentability Appln. No. PCT/CN2013/081363; Dated Oct. 27, 2015.
First Office Action (Chinese language) from State Intellectual Property Office of the People's Republic of China for Application No. CN201310150632.1, issued Feb. 16, 2015; 6 pages.
English translation of First Office Action from State Intellectual Property Office of the People's Republic of China for Application No. CN201310150632.1, issued Feb. 16, 2015; 4 pages.
English abstract of CN1559022A; 1 page.
English abstract of CN1624532A; 1 page.
English abstract of JP3693163B2; 2 pages.
International Search Report for International Application No. PCT/CN2013/081363, 13pgs.
Third Chinese Office Action dated Jan. 19, 2016; Appln. No. 201310150632.1.

* cited by examiner

LIQUID CRYSTAL PANEL AND LIQUID CRYSTAL DISPLAY

CROSS REFERENCE TO RELATED APPLICATIONS

This application is based on International Application No. PCT/CN2013/081363 filed on Aug. 13, 2013, which claims priority to Chinese National Application No. 201310150632.1 filed on Apr. 26, 2013. The entire contents of each and every foregoing application are incorporated herein by reference.

FIELD OF THE ART

Embodiments of the invention relate to the field of display technologies, more particularly, to a liquid crystal panel and a liquid crystal display (LCD).

BACKGROUND

A typical LCD mainly comprises components such as a liquid crystal panel, a backlight source, a display panel and the like. When displaying an image, the backlight source of the LCD emits light, and then the emitted light passes through the liquid crystal panel to display the image, such that a user can view the image.

A conventional LCD has just one display panel, which means the image can only be displayed on this display panel. However, the demands of users may be various, for example, when a user A is watching a movie, a user B might want to watch a sport match. Therefore, different display panels are required to meet the demands of individual users. In this case, other than meeting the demands of different users by using two individual LCDs, a possible implementation is to attach two modules (each of which comprises a liquid crystal panel and a backlight source) together to realize dual-side display. However, such an implementation requires two liquid crystal panels and two backlights, which makes the cost high.

SUMMARY

Embodiments of the invention provide a liquid crystal panel and a LCD for realizing dual-side display at a lower cost.

A first aspect of the invention provides a liquid crystal panel, comprising an array substrate and a color filter substrate disposed as opposed to each other and a liquid crystal layer disposed between the array substrate and the color filter substrate, wherein a first barrier layer is disposed on the array substrate, the first barrier layer comprises a first part configured to reflect light and a second part configured to transmit light, the first and second parts are arranged alternately;

a second barrier layer is disposed on the color filter substrate, the second barrier layer comprises a third part configured to reflect light and a fourth part configured to transmit light, the third and fourth parts are arranged alternately;

the first part of the first barrier layer and the fourth part of the second barrier layer are equal in width and aligned to each other, the second part of the first barrier layer and the third part of the second barrier layer are equal in width and aligned to each other, such that light passing through the second part of the first barrier layer is reflected by the third part of the second barrier layer, and light passing through the fourth part of the second barrier layer is reflected by the first part of the first barrier layer.

As an example, the first barrier layer is disposed on a surface of the array substrate that is far from the liquid crystal layer.

As an example, the second barrier layer is disposed on a surface of the color filter substrate that is far from the liquid crystal layer.

As an example, the liquid crystal panel comprises a pixel array comprising a first pixel array part and a second pixel array part, the first pixel array part and the second pixel array part are uniform partitions and arranged alternately, the first pixel array part displays an image through the second part of the first barrier layer, the second pixel array part displays an image through the fourth part of the second barrier layer.

As an example, each of the first pixel array part and the second pixel array part comprises pixel units made up of three sub-pixel units of red, green and blue, the width of the first part, the second part, the third part and the fourth part is equal to that of the pixel unit.

As an example, the first part and the third part are made of a metal.

As an example, the light comes from an external light source and enters the liquid crystal layer by passing through the second part and/or the fourth part.

As an example, a resolution of the liquid crystal panel is 1920×1080 or higher.

A second aspect of the invention provides a LCD comprising any of the above liquid crystal panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
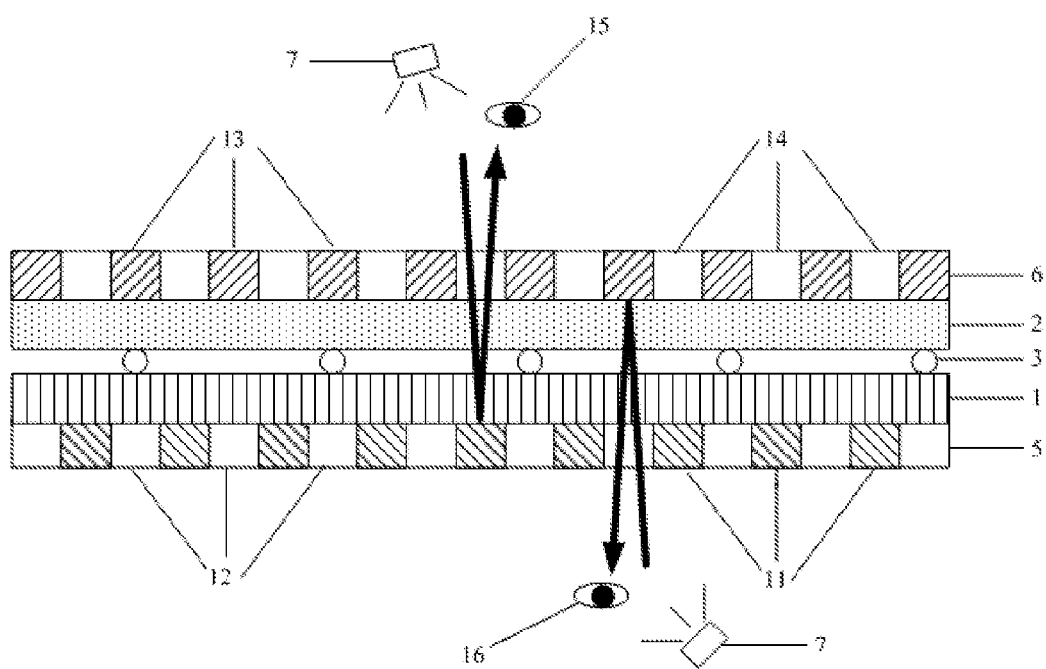
FIG. 1 schematically illustrates a simplified cross section of a liquid crystal panel in accordance with an embodiment of the invention.

FIG. 1 schematically illustrates a liquid crystal panel in accordance with an embodiment of the invention. With reference to FIG. 1, the liquid crystal panel provided by the embodiment of the invention comprises an array substrate 1 and a color filter substrate 2 disposed as opposed to each other and a liquid crystal layer 3 encapsulated between the array substrate 1 and the color filter substrate 2. A first barrier layer 5 is disposed on the array substrate 1, and a second barrier layer 6 is disposed on the color filter substrate 2. Herein, the first barrier layer 5 may be disposed on a surface of the array substrate 1 that is far from the liquid crystal layer 3. The second barrier layer 6 may be disposed on a distal surface of the color filter substrate 2 that is far from the liquid crystal layer 3. The first barrier layer 5 comprises a first part 11 configured to reflect light and a second part 12 configured to transmit light; there may be a plurality of the first parts 11 and the second parts 12, and the first parts 11 and the second parts 12 are arranged alternately. Similarly, the second barrier layer 6 comprises a third part 13 configured to reflect light and a fourth part 14 configured to transmit light; there may be a plurality of the third parts 13 and the fourth parts 14 arranged alternately.

The first part 11 of the first barrier layer 5 and the fourth part 14 of the second barrier layer 6 are equal in width and aligned to each other (that is, a distance between two first parts 11 is equal to a width of the fourth part 14), and the second part 12 of the first barrier layer 5 and the third part 13 of the second barrier layer 6 are equal in width and aligned to each other (that is, a distance between two second parts 12 is equal to a width of the third part 13), such that light transmitting the second part 12 of the first barrier layer 5 is reflected by the third part 13 of the second barrier layer 6, and light transmitting the fourth part 14 of the second barrier layer 6 is reflected by the first part 11 of the first barrier layer 5. The design of the first part 11 of the first barrier layer 5 and the fourth part 14 of the second barrier layer 6 being equal in width and aligned to each other and the second part 12 of the first barrier layer 5 and the third part 13 of the second barrier layer 6 being equal in width and aligned to each other not only allows viewers on both sides of the liquid crystal panel to see desired images, but also prevents one of the viewers from seeing the image presented for another viewer, thereby avoiding interference between the images on the front and back sides. In the embodiment of the invention, the first part 11, the second part 12, the third part 13 and the fourth part 14 preferably have equal width so as to facilitate to manufacture and achieve a better match with each other. In the embodiment of the invention, it is noted that the first part 11 and the second part 12 are arranged alternately means a first part 11 is immediate adjacent to a second part 12. In other words, other than the two first parts 11 at both ends, each first part 11 has two second parts 12 disposed on both sides with no gap in-between.

Figure 2:
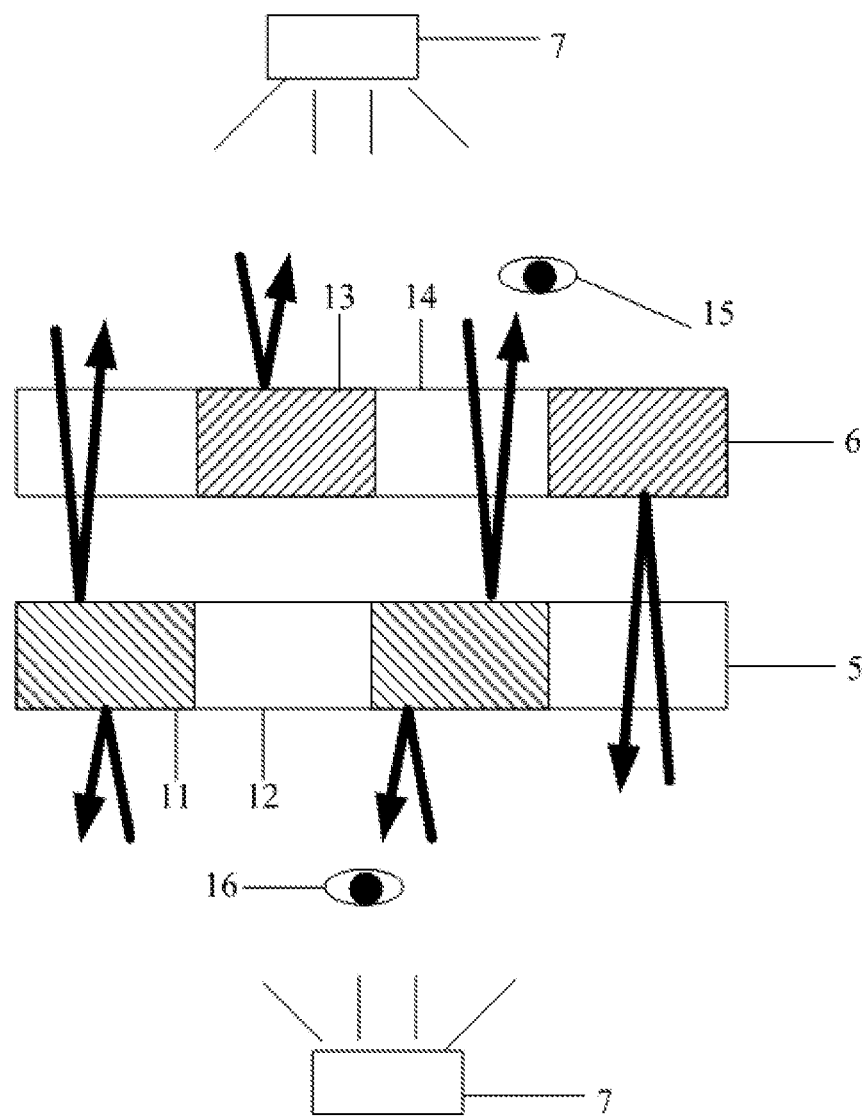
FIG. 2 schematically illustrates an operation principle of the liquid crystal panel illustrated in FIG. 1.

The principle of the invention will be further described in connection with FIG. 2, which is a simplified and enlarged schematic view of the liquid crystal panel of FIG. 2. With reference to FIG. 1 and FIG. 2, on the side of the color filter substrate 2, as the fourth part 14 is made of a transparent material, light emitted from the light source 7 at the top of FIG. 2 may be transmitted into the color filter substrate 2 and the liquid crystal layer 3 via the fourth part 14 and then arrives at the first part 11 of the array substrate 1. Since the first part 11 is made of a reflective material, reflection will occur at the inner surface of the first part 11, the reflected light further returns to the fourth part 14 and then exits, eventually enters the eyes 15 of the user, such that the user can see the image. On the side of the array substrate 1, as the second part 12 is made of a transparent material, therefore light emitted from the light source 7 at the bottom of FIG. 2 may be transmitted into the array substrate 2 and the liquid crystal layer 3 via the second part 14 and then arrives at the third part 13 of the color filter substrate 2. Since the third part 13 is made of a reflective material, reflection will occur at the inner surface of the third part 13, the reflected light further returns to the second part 12 and then exits, eventually enters the eyes 16 of another user, such that the anther user can see an image different from the one seen by the eyes 15.

In the embodiment of the invention, eyes 15 and 16 respectively represent different users. With the liquid crystal panel of the above embodiment, both the user at the side of eyes 15 and the user at the side of eyes 16 can see the image, thereby realizing dual-side display, and meeting various viewing demands by different users.

In the embodiment of the invention, the first part 11 and the third part 13 may be made of metal or other opaque materials having a reflective property. Alternatively, a reflective coating may be applied to the inner surfaces of the first part 11 and the third part 13. When the first part 11 and the third part 13 are metals, it may be any opaque and reflective metal such as gold, silver, copper and the like, which will not be specifically defined by the invention. The second part 12 and the fourth part 14 may be made of transparent material. It can be contemplated that the second part 12 and the fourth part 14 may also be void (such as air), which is within the scope of the invention.

Figure 3:
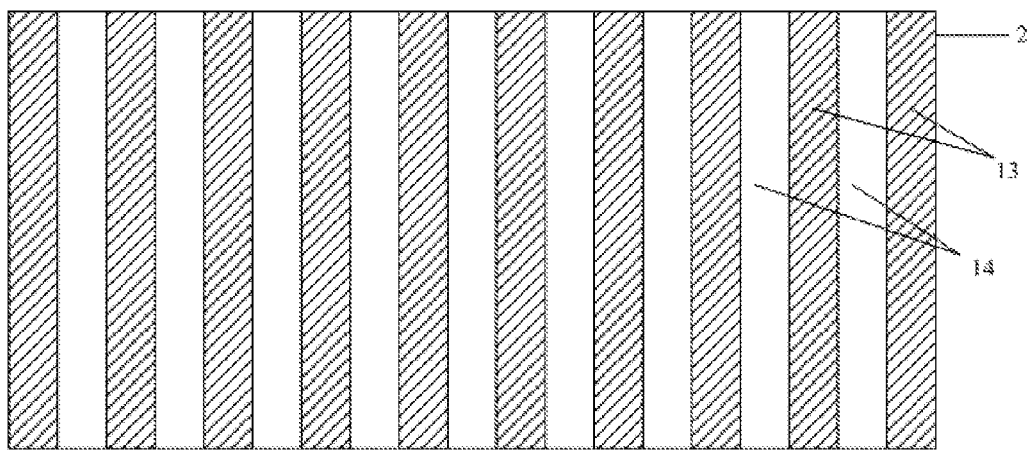
FIG. 3 schematically illustrates a barrier layer on a color filter substrate provided by an embodiment of the invention.
Figure 4:
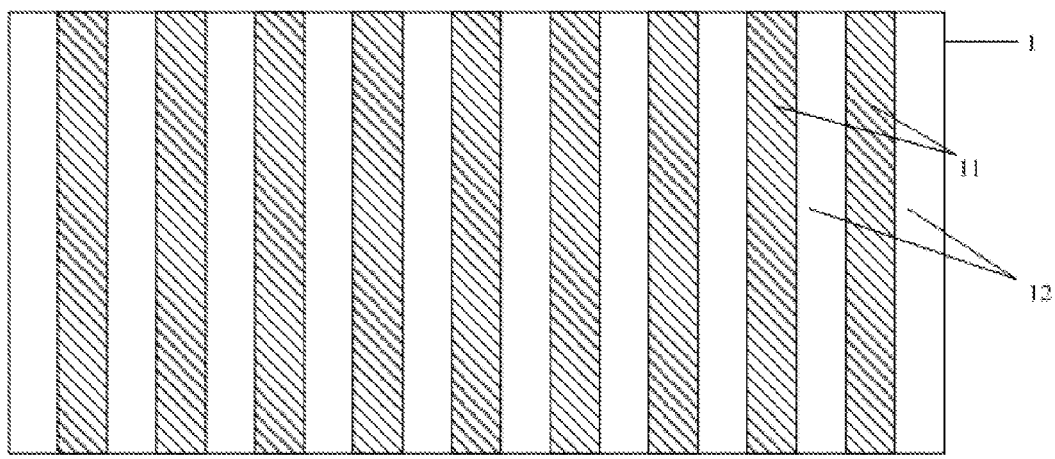
FIG. 4 schematically illustrates a barrier layer on an array substrate provided by an embodiment of the invention.

For example, FIG. 4 illustrates a top view of an exemplary first barrier layer 5, FIG. 3 illustrates a top view of an exemplary second barrier layer 6. Both the pattern of the first barrier layer 5 (that is, the first part 11) and the pattern of the second barrier layer 6 (i.e., the third part 13) have a vertical strip shape, and the width of the strips may equal to that of the pixel unit made up of RGB (red, green, blue) sub-pixels. It is noted that the pattern of the first barrier layer 5 and that of second barrier layer 6 are complementary, that is, the transparent part (i.e., the second part 12) of the first barrier layer 5 directly faces the opaque part (i.e., the third part 13) of the second barrier layer 6, the opaque part (i.e., the first part 11) of the first barrier layer 5 directly faces the transparent part (i.e., the fourth part 14) of the second barrier layer 6.

In the embodiment of the invention, light entering the second part 12 and/or the fourth part 14 may come from an external light source. The external light source may be ambient light, or an external light source that emits visible light, such as a light source set up by the user. In the invention, both the light entering the second part 12 and the light beam entering the fourth part 14 may come from the external light source. It is also possible that one of the lights entering the second part 12 and the fourth part 14 comes from the external light source. It can be contemplated that an entirety or a part of light entering the second part 12 or the fourth part 14 may come from the backlight source, which will not be specifically defined by the invention. In an embodiment, light for displaying images preferably comes from the external light source and enters the liquid crystal layer 3 by passing through the second part 12 and/or the fourth part 14. In this case, dual-side display can be realized in the external liquid crystal panel without the backlight source.

In the liquid crystal panel provided by the embodiment of the invention, on one hand, light may pass through the second part 12 of the first barrier layer 5 and the array substrate 1 as well as the color filter substrate 2, then arrives at the third part 13 of the second barrier layer 6 and reflected by the third part 13, in this way, an image can be displayed on one side of the panel. On the other hand, light may also pass through the fourth part 14 of the second barrier layer 6 and the color filter substrate 2 as well as the array substrate 1, then arrive at the first part 11 of the first barrier layer 5 and reflected by the first part 11, in this way, another image can be displayed on the other side of the panel.

It can be concluded from above description that a single liquid crystal panel can realize the function of dual-side display by using two barrier layers 5 and 6 which matched with each other, which can significantly save cost in comparison with conventional technologies that uses two liquid crystal panels.

Preferably, for the purpose of preventing the eyes 15 and eyes 16 from seeing the same and one image, different pixel units may be used to provide different images, such that the display of the images may be controlled in a better way. For example, two pixel array parts may be respectively used to provide the displayed images corresponding to the eyes 15 and the eyes 16. In another embodiment of the invention, the liquid crystal panel further comprises a plurality of pixel units, which is defined by intersecting a plurality of gate lines and a plurality of data lines and arranged as an array (referred to as pixel array hereafter). The pixel array comprises a first pixel array part and a second pixel array part, which is obtained by evenly dividing the array into two parts, the first pixel array part and the second pixel array part are arranged alternately. In other words, in the embodiment of the invention, the first pixel array part and the second pixel array part are uniform partitions and disposed alternately. The first pixel array part displays an image through the second part 12 of the first barrier layer 5, whereas the second pixel array part displays an image through the fourth part 14 of the second barrier layer 6. In other words, the first pixel array part displays the image seen by the eyes 16, and the second pixel array part displays the image seen by the eyes 15.

Figure 5:
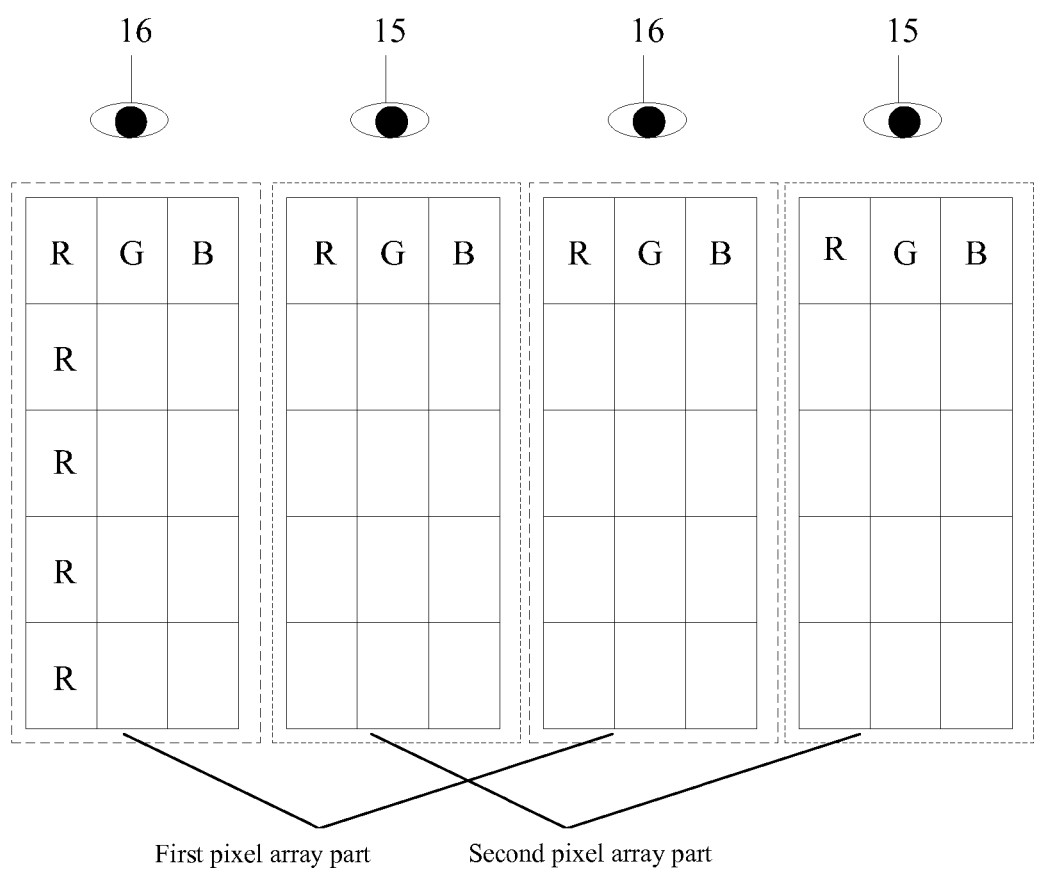
FIG. 5 schematically illustrates an exploded view of a pixel array on a liquid crystal panel provided by an embodiment of the invention.

With reference to FIG. 5, the first pixel array part and the second pixel array part are distinguished from each other by different broken line boxes, and eyes corresponding to the respective pixel array parts are indicated above the broken line boxes. That is to say, an image displayed by a pixel array part can be viewed by the eyes above. As illustrated in FIG. 5, the eyes 16 can see the image displayed by the first pixel array part, the eyes 15 can see the image displayed by the second pixel array part. It is understood that the first and second pixel array parts being illustrated as separated from each other is merely for convenience of displaying and distinguishing, and does not mean that the two parts are physically independent from each other. It is also noted that same numeral references in FIG. 5 represent the same user, while different numeral references represent different users. That is, each of the eyes 15 is related to one user, and each of the eyes 16 is related to another user. The user related to the eyes 15 see the image displayed by the second pixel array part, and the user related to the eyes 16 see the image displayed by the first pixel array part.

The embodiment allows different users to view different displayed images by using two pixel array parts respectively displaying respective images. In practice, it can be contemplated that a controlling circuitry in the liquid crystal panel has to be adaptively modified, in order to control the display of the two pixel array parts separately. As the principle of controlling the display of two pixel array parts is substantially same to that of controlling the display of one pixel array part, it will not be elaborated in the invention.

Furthermore, in yet another embodiment of the invention, the first pixel array part and the second pixel array part respectively include a plurality of pixel units comprising three sub-pixels of red (R), green (G) and blue (B). The width of the second part 12 and the third part 13 is equal to the width of the pixel unit in the first pixel array part. The width of the first part 11 and the fourth part 14 is equal to the width of the pixel unit in the second pixel array part. For example, with reference to FIG. 5, each column is preferably made up of the same sub-pixels. In other embodiments of the invention, each column may be made up of the sub-pixels being different from one another.

More preferably, all of the width of the first part 11, the second part 12, the third part 13 and the fourth part 14 is equal to that of the pixel unit. As the pixel unit made up of R, G, and B sub-pixels is the smallest unit for displaying a full color image, such a setting makes it possible to realize more precise display, thereby improving the quality of display and user experiences. It can be contemplated that those skilled in the art may set the number of sub-pixels included in each unit as required, which may be one, two or any other number, instead of being limited to three.

It is also noted that the liquid crystal panel provided by the embodiment of the invention is preferably applied to a high resolution scenario. As long as the resolution of the liquid display panel is high enough, such as with Full High-Definition (FHD) Ultra high Definition (UD) panels, the user can not perceive any difference from regularly displayed images, thereby achieving an ideal dual-size display effect. For example, in the embodiment of the invention, a resolution of the liquid crystal panel may be 1920×1080 or higher.

Moreover, an embodiment of the invention further provides a LCD which comprises any of the afore-mentioned liquid crystal panels. Herein, for detailed descriptions of the liquid crystal panel, please refer to the preceding description which will not be elaborated here.

The LCD provided by the embodiment of the invention realizes dual-side display effect with just one liquid crystal panel by disposing two complementary barrier layers outside the array substrate and the color filter substrate respectively and dividing the pixels of the pixel array inside the liquid crystal panel into two ports which respectively display the front and back images.

Figure 6:
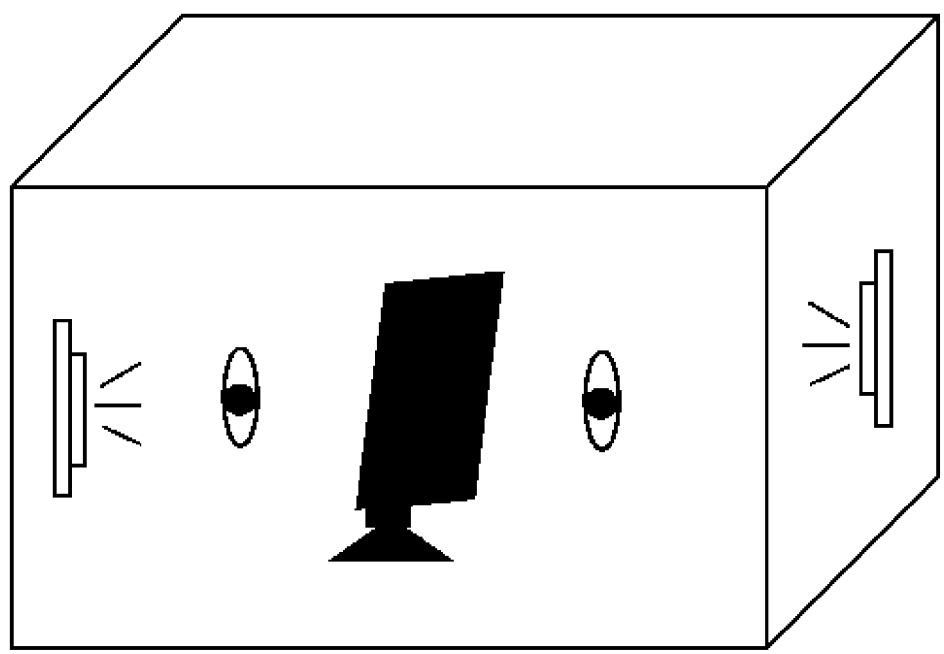
FIG. 6 schematically illustrates a configuration of a LCD provided by an embodiment of the invention.

In one embodiment, as illustrated in FIG. 6, the LCD provided by the embodiment of the invention may not comprise a backlight source. Instead, light is provided by an external light source, thereby further reducing the cost of the LCD.

The LCD provided by the embodiment of the invention can realize dual-side display of the LCD by using the external light source, as illustrated in FIG. 6, thus, the users at both the front and back sides of the LCD can view the programs.

What are described above is related to the illustrative embodiments of the disclosure only and not limitative to the scope of the disclosure; the scopes of the disclosure are defined by the accompanying claims.

What is claim is:

1. A liquid crystal panel, comprising an array substrate and a color filter substrate disposed as opposed to each other and a liquid crystal layer disposed between the array substrate and the color filter substrate,
   wherein a first barrier layer is disposed on the array substrate, the first barrier layer comprises a first part configured to reflect light and a second part configured to transmit light, the first and second parts are arranged alternately;
   a second barrier layer is disposed on the color filter substrate, the second barrier layer comprises a third part configured to reflect light and a fourth part configured to transmit light, the third and fourth parts are arranged alternately;
   the first part of the first barrier layer and the fourth part of the second barrier layer are equal in width and aligned to each other, the second part of the first barrier layer and the third part of the second barrier layer are equal in width and aligned to each other, such that light passing through the second part of the first barrier layer is reflected by the third part of the second barrier layer, and light passing through the fourth part of the second barrier layer is reflected by the first part of the first barrier layer;
   wherein the first barrier layer is disposed on an outer surface of the array substrate, and the second barrier layer is disposed on an outer surface of the color filter substrate.

2. The liquid crystal panel of claim 1, wherein the liquid crystal panel comprises a pixel array comprising a first pixel array part and a second pixel array part, the first pixel array part and the second pixel array part are uniform partitions and arranged alternately, the first pixel array part displays an image through the second part of the first barrier layer, the second pixel array part displays an image through the fourth part of the second barrier layer.

3. The liquid crystal panel of claim 2, wherein each of the first pixel array part and the second pixel array part comprises pixel units made up of three sub-pixel units of red, green and blue, the width of the first part, the second part, the third part and the fourth part is equal to that of the pixel unit.

4. The liquid crystal panel of claim 3, wherein the first part and the third part are made of a reflective material or coated with a reflective coating.

5. The liquid crystal panel of claim 3, wherein the light comes from an external light source and enters the liquid crystal layer by passing through the second part and/or the fourth part.

6. The liquid crystal panel of claim 2, wherein the first part and the third part are made of a reflective material or coated with a reflective coating.

7. The liquid crystal panel of claim 2, wherein the light comes from an external light source and enters the liquid crystal layer by passing through the second part and/or the fourth part.

8. The liquid crystal panel of claim 2, wherein a resolution of the liquid crystal panel is 1920×1080 or higher.

9. The liquid crystal panel of claim 1, wherein the first part and the third part are made of a reflective material or coated with a reflective coating.

10. The liquid crystal panel of any of claim 1, wherein the light comes from an external light source and enters the liquid crystal layer by passing through the second part and/or the fourth part.

11. The liquid crystal panel of any of claim 1, wherein a resolution of the liquid crystal panel is 1920×1080 or higher.

12. A liquid crystal display comprising the liquid crystal panel of claim 1.

* * * * *